April 9, 1935. H. H. GROSS 1,997,174
REVIVIFYING ADSORBENT MATERIALS
Filed Oct. 20, 1932
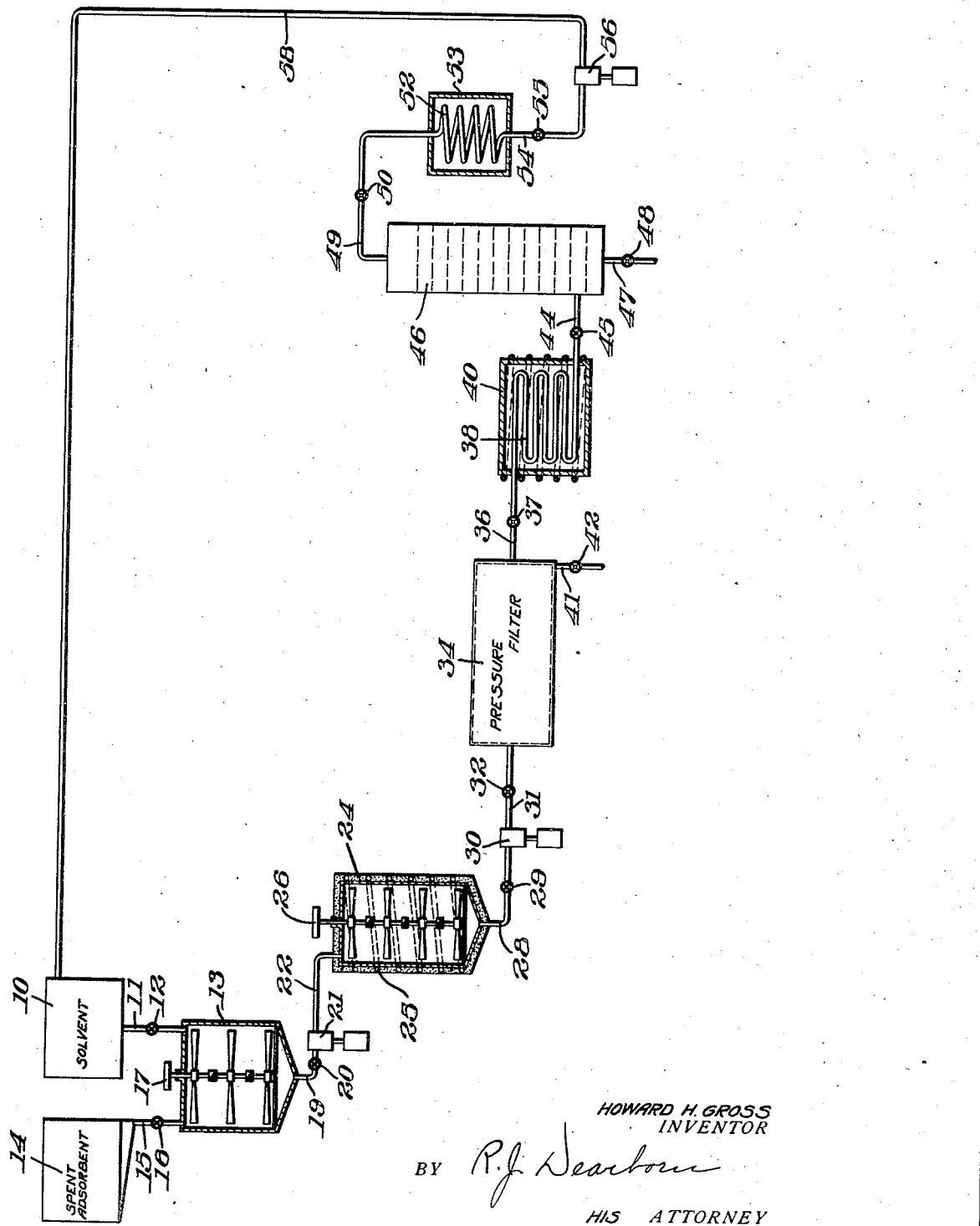
HOWARD H. GROSS
INVENTOR
BY R. J. Dearborn
HIS ATTORNEY Patented Apr. 9, 1935

1,997,174

UNITED STATES PATENT OFFICE 1,997,174

REVIVIFYING ADSORBENT MATERIALS

Howard H. Gross, Beacon, N. Y., assignor to The Texas Company, New York, N. Y., a corporation of Delaware Application October 20, 1932, Serial No. 638,720

9 Claims. (Cl. 252—2)

This invention relates to methods of treating decolorizing earth or clay or equivalent material which has been used in the treatment of hydrocarbon oils, and contemplates a process of removing adsorbed coloring matter, polymers and oil from the pores of the earth or clay and the rejuvenation of the adsorbent and decolorizing qualities thereof.

It has been generally recognized that the coloring element in hydrocarbon oil consists of asphaltic material which is finely dispersed therein, and when filtering such oils to improve the color, the asphalt-like material is selectively adsorbed on the surface and in the pores of the filter medium. The action of the decolorizing earths and clays is not, however, limited to merely adsorbing coloring materials but, in many cases, extends to a polymerization of unstable, unsaturated compounds present in the oils and the subsequent adsorption of the polymers formed in this way.

In the case of decolorizing earths of the type of fuller's earth which have been used in the treatment of petroleum oils and which have become spent, the adsorbed polymers, asphaltic coloring matters and oil are removed by subjecting the earth to a treatment in which it is burned in a rotary kiln. This burning treatment may be preceded by a naphtha washing and steaming. In the course of the burning operation, the adsorbed materials present in the pores and on the surface of the earth are partially removed by the combined distilling and oxidizing effects of the burning.

It has been found that a considerable proportion of the adsorbed material present in the pores of the decolorizing earth becomes carbonized and, as a result, the decolorizing and adsorptive efficiency of the clay is considerably less than its original efficiency. It is thus apparent that after several recoveries the clay will have deteriorated to such an extent as to be of no further use in decolorizing or treating oil.

Although the method of heating or burning, which has just been described, is used in the revivification of fuller's earth, it is entirely unsatisfactory for rejuvenating certain types of clay which now find wide use in the treatment of hydrocarbon oils. These clays are sometimes spoken of as activated clays or acid treated clays, since it is found that in their natural condition they have little or no decolorizing or adsorptive power but, when treated with acid, develop an active structure and, in many cases, are many times more active than the ordinary fuller's earth.

In the case of these acid treated clays, revivification can not be effected by means of burning or heating since the active structure is extremely susceptible to destruction under high temperature conditions and, in most cases where the spent acid treated clays are subjected to a heat treatment, the clays instead of being revived, are rendered useless.

The revivification of decolorizing earths both of the class of fuller's earth as well as of the activated clays may be accomplished with much greater efficiency by dissolving out the adsorbed polymers, coloring matters and oils by means of a solvent which has no harmful effect upon the structure of the clay itself. I have found that when either type of spent adsorbent is extracted with furfural, the adsorbed materials which fill the pores and cover the surface, are substantially dissolved out and removed and the adsorbent so treated will be revived to approximately its initial efficiency. Not only furfural alone but mixed solvents containing furfural may be advantageously used for revivifying spent adsorbents. In certain operations, I have found that when furfural is mixed with relatively large proportions of certain cheaper solvents such as benzol and gasoline, the resultant mixture may be used with results almost equal to those obtainable by the use of furfural alone.

The revivification of a spent adsorbent catalyst, with either furfural alone or furfural in admixture with another solvent, may be greatly facilitated by carrying out the extraction at elevated temperatures and at such pressure as is necessary to maintain the solvents substantially in the liquid state. Whereas under normal conditions of temperature and pressure, the adsorbent may require extraction with a large volume of solvent to effect revivification, if the process is carried out at relatively high temperatures the time of washing and extracting is greatly shortened, resulting in a much more economical recovery of the adsorbent material. The exact reason for the increased efficiency of the solvents at elevated temperatures is not known. However, it is believed that the effect of the increased temperature is to lessen the adsorptive power of the clay and in this way assist in the solution of the adsorbent materials by the solvent.

In the choice of the proper temperature for carrying out the extraction of the adsorbent material from the adsorbent, it has been found that the operation is most readily carried out at a temperature slightly in excess of the temperature at which the adsorbent displays its maximum efficiency. In the case of fuller's earth, the temperature is in the neighborhood of 100° F., while in the case of the acid treated clays, the temperature may be in the range of from 250 to 350° F. In the practice of the invention it will be found that the characteristics of the clay to be revivified and the petroleum product upon which the clay has been used, will determine to a considerable degree whether or not it is desirable to use either furfural alone or in admixture with another solvent.

In order to more fully describe the invention, there is given herewith a brief description of a method of carrying out a revivification of adsorbent material by means of furfural alone or in admixture with other solvents.

A preferred form of apparatus for practicing the invention is illustrated diagrammatically in the accompanying drawing, Figure 1, wherein the numeral 10 designates a storage vessel for furfural or a mixture of furfural with benzol or another solvent. This vessel is fitted with a drawoff line 10 controlled by the valve 12, which connects the storage chamber with the mixing chamber 13. To the mixing chamber 13 there is also connected the spent adsorbent storage chamber 14 by means of the line 15 controlled by the valve 16.

The mixing chamber 13 is fitted with a mechanical agitator 17, whereby the solvent is preliminarily mixed with the spent adsorbent. The bottom of the mixing chamber, which may advantageously have a conical shape, is connected by means of the line 19 controlled by the valve 20 with the inlet side of the pump 21. This pump discharges through the line 22 into the digester 24.

The digester 24 is constructed to withstand high pressures and is supplied with heating coils 25 through which steam or other heating media may be circulated. It is fitted with a mechanical mixing device 26 which serves to effect intimate contact between the particles of the spent adsorbent with the solvent. The bottom of the digester which may, with advantage, be of conical form, is supplied with a drawoff line 28 controlled by the valve 29 which connects the digester with the inlet side of the pump 30. This pump discharges through the line 31 and the valve 32 into the pressure filter 34.

The pressure filter is used for separating the revivified clay from the solvent and dissolved impurities. The filtrate from the filter is drawn off through the line 36 controlled by the valve 37, and is discharged into the coil 38 of the heater 40. The revivified clay, which is separated by the pressure filter, is discharged through the line 41 controlled by the valve 42, to a suitable storage (not shown).

The heater 40 may, with advantage, be of a type wherein filtrate is heated by heat interchange with a liquid heating medium. The discharge end of the coil 38 is connected through the line 44 controlled by the valve 45 with a lower point of the fractionating tower 46. This tower may either be packed with tile or else supplied with the conventional bubble caps and trays. Into the bottom of the tower there is fitted a discharge line 47 controlled by the valve 48 which connects it with a suitable storage (not shown) for polymers and oil. The top of the tower is equipped with a vapor line 49 controlled by the valve 50 which communicates with the cooling coil 52 of the condenser 53. The outlet of this condenser coil communicates with the inlet side of the pump 56 through the line 54 controlled by the valve 55, while the discharge side of the pump is connected through the line 58 with the solvent tank 10.

In a typical operation of the process in connection with the apparatus as shown in Fig. 1, furfural or a mixture of furfural with benzol or with some other solvent, is passed through the line 11 controlled by the valve 12 into the mixing chamber 13. Simultaneously, a proportioned amount of spent adsorbent is introduced into the mixing chamber 13 from the spent adsorbent storage tank 14, through the line 15 controlled by the valve 16.

Within the mixing chamber 13, the adsorbent and solvent are thoroughly mixed to form a more or less uniform suspension. This suspension is drawn off from the bottom of the mixing chamber 13 through the line 19 and the valve 20 into the suction side of the pump 21 which is designed to deliver the mixture of spent adsorbent and solvent into the digester under the proper pressure. Within the digester, the spent adsorbent is thoroughly agitated with the solvent and, under certain conditions of operation, it may be desirable to maintain the contents of the digester at an elevated temperature which may be as high as 400° F. and under a pressure of from 100 to 200 lbs. per sq. in. Normally, the adsorbed materials present in the spent adsorbent are readily dissolved by the solvent, and only a short time of agitation is necessary for substantially dissolving them. The mixture of spent adsorbent and solvent, having in solution the asphaltic coloring matters, polymers and oils which were adsorbed on the adsorbent, is delivered to the pump 30 through the draw-off line 28 controlled by the valve 29. This pump serves to charge the mixture to the pressure filter 34 wherein the rejuvenated clay is substantially separated from the solvent and dissolved materials.

The rejuvenated clay, separated by the filtration operation, is drawn off from the filter through the line 41 controlled by the valve 42, and passes to suitable storage while the filtrate passes through the line 36 and the valve 37 into the coil 38 of the heater 40 wherein its temperature may be raised above the boiling point of the solvent or mixture of solvents. The heated solution leaves the coil 38 through the line 44 controlled by the valve 45, passes into the fractionating tower 46 wherein substantial vaporization of the solvent or solvents takes place. The unvaporized residuum, consisting of polymers and oil, which collects at the bottom of the tower, may be drawn off through the line 47 controlled by the valve 48. The vapors of the solvent or solvents are drawn off from the top of the fractionating tower through the vapor line 49 and the valve 50, and pass into the cooling coils 52 of the condenser 53 where they are condensed. The condensate, formed in these coils, passes through the line 54 controlled by the valve 55 to the pump 56 which delivers the solvent or solvents through the line 58 to the solvent storage tank 10.

In some operations, it may be desirable to maintain either the fractionating tower 46 alone or both the fractionating tower 46 and the condenser 53 under pressure. This may be accomplished by the proper manipulations of the valves 45, 50 and 55.

The use of furfural or mixtures of furfural with other solvents is not limited to operations such as that described in the above example, but may be applied in any instance and under any condition where it is desired to remove adsorbed asphaltic coloring matters, polymers or oils from decolorizing or adsorbing materials. So, for example, acid-treated clay which has been used for the contact filtration of lubricating oils, and which has been separated from the oil, may be revivified while it is present within the filter press by subjecting it to a washing with furfural or a mixture of furfural and benzol. Similarly, fuller's earth which has become spent in the percolation of medicinal oils or the like may be rejuvenated while it is in situ in the filter chamber by causing furfural to flow through the body of spent clay and in this way to dissolve out the undesirable adsorbed materials.

Obviously many modifications and variations of the invention, as hereinbefore set forth, may be made without departing from the spirit and scope thereof, and therefore only such limitations should be imposed as are indicated in the appended claims.

I claim:

1. The process of revivifying adsorbent materials spent in refining petroleum hydrocarbon oil which comprises extracting adsorbed hydrocarbon material therefrom by treating the adsorbent with a solvent comprising furfural and benzol.

2. The process of revivifying adsorbent materials spent in refining petroleum hydrocarbon oil which comprises extracting adsorbed hydrocarbon material therefrom by treating the adsorbent with a solvent comprising furfural and gasoline.

3. A method of revivifying by treatment with furfural, adsorbent material, containing polymers adsorbed in the refining of petroleum hydrocarbons, which comprises mixing together the adsorbent material and the furfural to form an intimate mixture, subjecting this mixture to filtration to separate the solution of polymers and furfural from the revivified clay, withdrawing the clay and subjecting the solution to distillation to effect the separation of the polymers from the furfural.

4. The process of revivifying adsorbent material spent in refining petroleum hydrocarbon oils which comprises extracting the adsorbed hydrocarbon impurities therefrom by treating the adsorbent with furfural at a temperature above that at which the fresh adsorbent displays its maximum adsorptive efficiency when employed in the contacting of petroleum hydrocarbon oils.

5. The process of revivifying adsorbent material spent in refining petroleum hydrocarbon oils which comprises extracting the adsorbed hydrocarbon impurities therefrom by treating the adsorbent with furfural at a temperature above that at which the fresh adsorbent displays its maximum adsorptive efficiency when employed in the contacting of petroleum hydrocarbon oils and under such pressure as to maintain the furfural substantially in the liquid phase.

6. The process of revivifying adsorbent materials spent in refining petroleum hydrocarbon oils which comprises extracting the adsorbed hydrocarbon impurities therefrom by treating the adsorbent with a mixture of benzol and furfural at a temperature above that at which the fresh adsorbent displays its maximum adsorptive efficiency when employed in the contacting of petroleum hydrocarbon oils and under such a pressure as to maintain the solvent mixture substantially in the liquid phase.

7. The process of revivifying adsorbent material which has been used in refining petroleum hydrocarbon oil which comprises treating the adsorbent with a solvent comprising furfural at temperatures from 100 to 400° F. and at superatmospheric pressures from 100 to 200 pounds per square inch, whereby the solvent is maintained in the liquid phase.

8. The process of revivifying adsorbent material which has been used in refining petroleum hydrocarbon oil which comprises treating the adsorbent with a solvent comprising furfural.

9. The process of revivifying adsorbent material which has been used in refining petroleum hydrocarbon oil, which comprises treating the adsorbent with a solvent comprising furfural in admixture with another solvent, said mixture having the essential solvent properties of furfural.

HOWARD H. GROSS.